April 30, 1929.　　　A. WUNDERLICH　　　1,710,759
LUBRICANT TRANSFERRING DEVICE
Filed Aug. 20, 1927
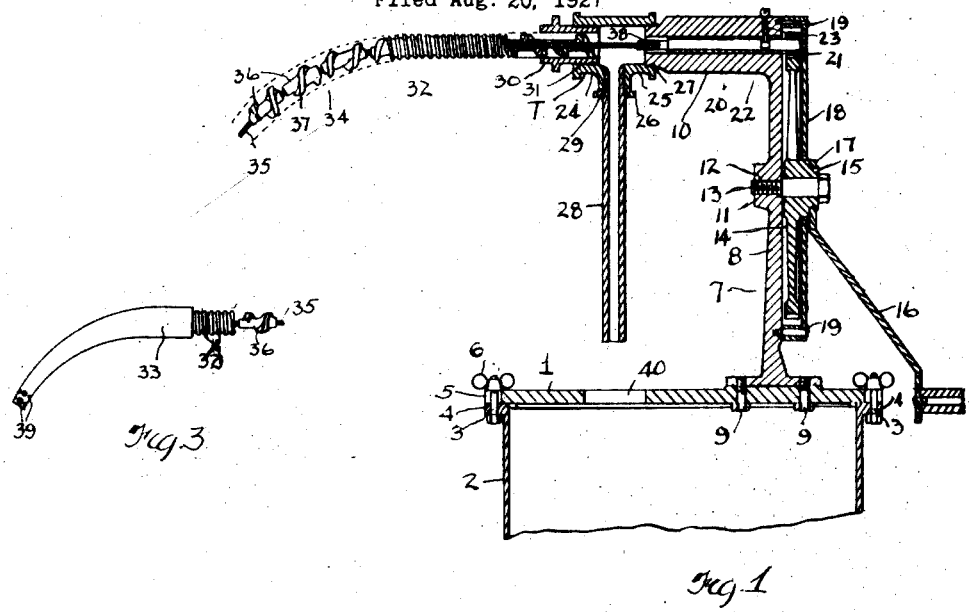
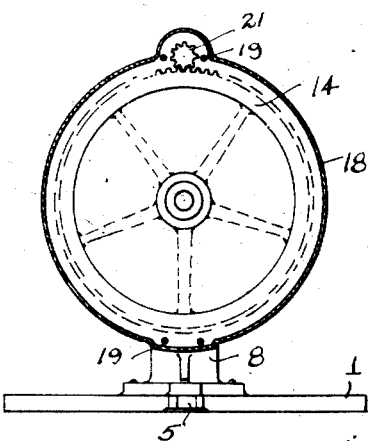
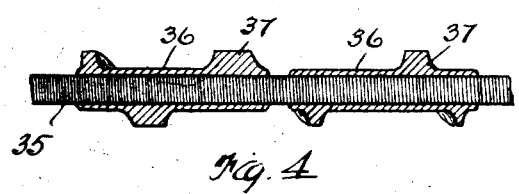
INVENTOR.
Adolph Wunderlich
BY
Fay, Oberlin & Fay
ATTORNEYS.

Patented Apr. 30, 1929.

1,710,759

UNITED STATES PATENT OFFICE.

ADOLPH WUNDERLICH, OF CLEVELAND HEIGHTS, OHIO, ASSIGNOR TO THE WARREN REFINING AND CHEMICAL COMPANY, OF CLEVELAND, OHIO, A CORPORATION OF OHIO.

LUBRICANT-TRANSFERRING DEVICE.

Application filed August 20, 1927. Serial No. 214,249.

As indicated, the present invention relates to a device for transferring lubricant or other similar semi-solid viscid materials.

It comprises, essentially a base carrying a casing enclosing a gear wheel adapted to be operated by a crank and a shaft carrying a gear in mesh with such gear wheel, said casing being attached to one branch of a T coupling to the other branch of which is attached a flexible tube enclosing a worm conveyor attached to the shaft. Rotation of the conveyor is effected by operation of the crank.

A great many machines must be lubricated by heavy grease, and it is desirable that, periodically, this grease shall be completely removed from its casing and replaced by new grease. For instance, in the transmission and differential housings of an automobile, heavy grease is used and unless it is changed at intervals, it becomes very dirty and impregnated with particles of metal, whereby its efficiency as a lubricant is materially lessened. It has been, however, practically impossible to remove this old grease from such casings with known instrumentalities, and it is the object of this invention to provide an implement whereby such grease may easily be removed. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a transverse sectional view of my lubricant transferring device, showing the device mounted upon a container to receive the removed grease; Fig. 2 is an elevation of the right hand end of the device as shown in Fig. 1, the cover for the gear wheel and gear having been removed; Fig. 3 is an elevation partly in section of the intake nozzle of my device showing a short section of the flexible tube and of the worm conveyor; and Fig. 4 is a detail section of a fragmentary portion of the novel worm conveyor used in my device.

Referring to the above mentioned drawings, the numeral 1 indicates the base plate of my device which is adapted to be attached to the upper open end of a container 2 by means of bolts 3 passing through flanges 4 on the container and entering the bifurcated ears 5 on the base. Wing nuts 6 may be tightened to hold the base plate 1 rigidly in place. The casing 7 comprises a standard 8 attached to the base plate by means of machine screws 9 and a right angularly extending tubular boss 10 at the upper end thereof. Slightly higher than midway of the length of the standard 8, there is provided a boss 11 having an aperture 12 therethrough in which a spindle 13 is engaged. The gear wheel 14 is mounted on said spindle 13 and is provided with a polygonal projection 15 upon which is engaged the polygonal socket 17 of the handle or crank 16. A cover 18 is secured to the standard 8 by means of the machine screws 19 in such a position as to enclose a gear wheel 14 and gear 21.

Said gear 21 is carried by a shaft 20 mounted in the extension 10, and is held in engaging relation to the gear wheel 14 by means of a screw 23 mounted in the extension and extending into a groove 22 in the shaft 20.

A T coupling is secured to said extension 10 by means of the screw-threaded connection 27 of one of its branches 25. To the stem of said coupling 26 is attached the outlet tube 28 by means of a screw-threaded connection 29. The coupling member 30 is threadedly attached as at 31 to the other branch 24 of the T coupling, and the flexible tube 32 is secured to said coupling 30 by well known means. Said tube 32 carries at its free end a nozzle 33, and encloses a flexible worm conveyor 34. Said conveyor is made up of a tightly coiled spring 35 to which are attached a plurality of worm segments 36 having thereon threads 37. The segments 36 are non-rotatably attached to the spring 35, and are so positioned that the threads 37 of adjacent segments form substantially a continuous worm.

The spring 35 extends through the coupling T and is inserted and tightly crimped in a socket 38 formed in the outer end of the spindle 20.

The nozzle 33 is closed at its outer end and is provided with a plurality of lateral apertures 39 circumferentially spaced near its end.

The operation of the device is believed to be apparent from the above description, but a summary thereof will be given. The nozzle 33 is inserted in the filling opening of a casing from which grease or similar material is to be removed, and the crank 16 is rotated to cause the rotation of the worm 34 through the co-action of the gear wheel 14 and the gear 21. As the worm is rotated, the grease in the casing is drawn in through the apertures 39 and is carried through the tube 32 by the worm 34 in the well known manner. The grease is thus conducted into the chamber formed in the coupling T and as more grease is carried up through the tube 32 the grease in the chamber is forced out through the tube 28 whence it drops through the aperture 40 in the base plate 1 into the container 2. The nozzle may be moved about inside the casing in which the grease is contained, thereby reaching all of the grease in the casing.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. As a new article of manufacture, a flexible segmental worm conveyor formed by mounting tubular worm segments on an elongated, tightly coiled spring, said segments being progressively and non-rotatably mounted on said spring.

2. A device of the class described comprising a casing, intake and outlet tubes leading from said casing, a nozzle at the free end of said intake tube and formed with a closed end and with a plurality of laterally opening apertures, a worm conveyor in said intake tube, and means to drive said worm.

3. A device of the class described comprising an ordinary T coupling, a flexible intake tube leading from one branch of said T, a nozzle attached to the free end of said tube, a flexible worm conveyor in said tube, an outlet pipe leading from the stem of said T, and means for driving said worm connected to the other branch of said T.

4. A device of the class described comprising a T coupling, an outlet pipe carried by the stem of said T, a flexible intake tube carried by one branch of said T, a nozzle connected to the free end of said intake tube, a casing connected to the other branch of said T, a gear wheel in said casing, an operating crank connected to said gear wheel, a flexible worm conveyor in said intake tube and extending through said T, a shaft attached to the inner end of said conveyor and mounted in said casing, and a gear on said shaft and co-operating with said gear wheel.

5. The device recited in claim 4, wherein the flexible worm conveyor comprises an elongated coiled spring having short worm segments progressively and non-rotatably mounted thereon.

6. A device of the class described comprising a base having an aperture therethrough, bifurcated ears diametrically spaced on said base for attaching said base to a container, a casing mounted on said base and enclosing a gear wheel, a handle connected to said gear wheel, a shaft in said casing, a gear carried by said shaft, a groove in said shaft, a screw mounted in said casing and extending into said groove to hold said gear in mesh with said gear wheel, a T coupling having one branch thereof screw-threadedly attached to said casing, an outlet tube threaded into the stem of said T and extending to a point adjacent said base aperture, a flexible intake tube threaded into the other branch of said T, a nozzle at the free end of said intake tube, and a flexible screw conveyor in said intake tube and extending through said T and coupled to said shaft.

Signed by me this 16th day of August, 1927.

ADOLPH WUNDERLICH.